Feb. 29, 1944.  L. A. CARNEY  2,343,106
LAP JOINT
Filed March 13, 1943
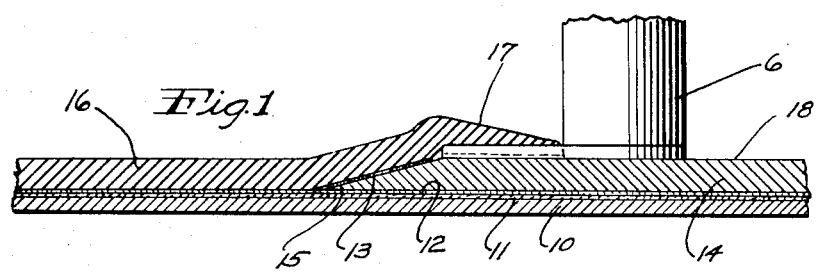
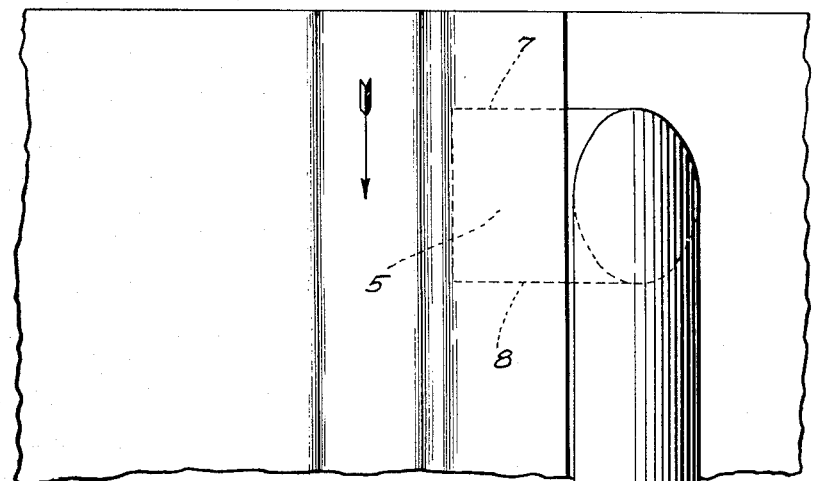
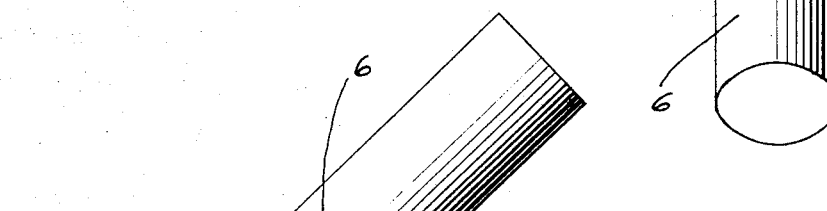
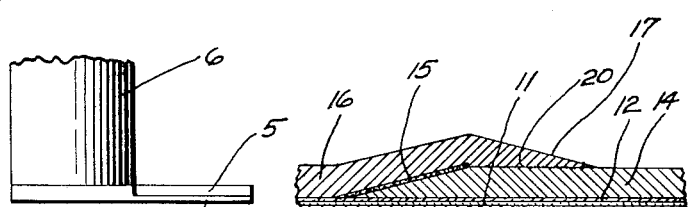
Inventor
Lynn A. Carney
By
Attorney Patented Feb. 29, 1944

2,343,106

UNITED STATES PATENT OFFICE 2,343,106

LAP JOINT

Lynn A. Carney, Akron, Ohio, assignor to Wingfoot Corporation, Akron, Ohio, a corporation of Delaware Application March 13, 1943, Serial No. 479,031

1 Claim. (Cl. 220—63)

This invention relates to an improved method of lining a tank with a heat-sealable plastic material. The invention relates more particularly to a new form of lap joint formed in the lining. According to this invention, parts of the overlapping portions of the lining material at the lap joint are cemented together, and at the inner edge of the joint the lapped surfaces are united by heat and pressure. The cement gives a strong bond between the surfaces, and the heat seal formed at the inner edge of the joint prevents liquids contained in the tank from coming in contact with the cement. With this type of lap joint the liquid contents of the tank—whatever they may be—come in contact only with the plastic material and never contact the cement. If the plastic is resistant to the liquids in the tank, the tank may be used for holding such liquids regardless of the nature of the cement employed and irrespective of whether the cement would be attacked by the liquids if the two were brought into contact with one another.

The invention will be further described in connection with the accompanying drawing in which Fig. 1 is a section through the tank and lining showing the means of forming the heat seal, Fig. 2 is a plan view of the same, Figs. 3 and 4 are side views of the implement used in forming the seal taken at right angles to one another, and Fig. 5 is a section illustrating the finished joint.

The implement employed will be first described because it facilitates the formation of the heat seal. It comprises the blade 5 and the handle 6. It is preferably composed of copper, and the blade 5, which is heated, is advantageously coated with silver or chromium to prevent the copper from chemically reacting with the plastic material as the implement is heated. The blade is preferably formed with a narrower edge 7 and a wider edge 8 and with the upper surface of the blade tapered gradually from the edge 8 to the edge 7. The blade 5 is advantageously heated by resistance coils (not shown) in the same manner as a branding or soldering iron and for this purpose is supplied with current by wires (not shown) which are led down through the handle.

In lining the tank, it may be necessary to use one cement for adherence to the metal and a different cement for adherence to the plastic. Suitable cements for these respective purposes are:

Cement A

| | Pounds |
|---|---|
| Chlorinated rubber | 90 |
| Toluol | 519 |

The chlorinated rubber may be the 125-centipoise type Parlon manufactured by the Hercules Powder Company.

Cement B

| | Pounds |
|---|---|
| Neoprene type E manufactured by E. I. du Pont de Nemours and Company | 964 |
| Zinc oxide | 51 |
| Thermatomic black | 48 |
| Sulfur | 10 |
| Catechol | 13 |
| Denatured alcohol | 16 |
| Benzol | 6583 |

The catechol is added to the cement as a kicker immediately before application to cause the cement to set up more quickly. It may be omitted. Cyclohexanone or other solvent may be used to replace some of the benzol.

In lining the tank, the metal surface 10 is thoroughly cleaned by sand or grit blasting or by an emery wheel. A layer 11 of Cement A is then applied. This is allowed to dry, and then a second coat of the same cement is applied and, while still wet, followed by the first coat of Cement B. This is allowed to dry completely, and a second coat of Cement B is applied and allowed to dry. These two coats form the layer 12. Two coats of Cement B are similarly applied to the beveled edge 13 of the underlayer of plastic. These are indicated by the reference numeral 15. The lap joint is then formed with the plastic sheet 16.

Two coats of Cement B are applied to the underside of the plastic sheets 14 and 16 as follows: The plastic is first thoroughly scrubbed with cyclohexanone, and then a coat of Cement B is immediately applied and allowed to dry. Then a second coat of Cement B is applied. When the solvent has all evaporated, the plastic is pressed in place on the cemented metal.

The sheet 16 is cut so that it is sufficiently long to cover the skived surface 13 and to extend for a limited distance onto the flat surface 18 of the sheet 14. Its inner edge 17 is preferably skived. Cement is advantageously so applied that it contacts only the skived surface 13 of the sheet 14. The underside of the inner portion of the lapped sheet 16 and the flat surface 18 of the under sheet in an area adjacent the top of the skived surface 13 are heated by the implement shown or by other suitable means and are then pressed together to form a heat seal 20 (Fig. 5).

As best illustrated in Fig. 2, the narrow edge of the blade 7 trails so that as the two surfaces are heated and the implement is drawn down (the direction being indicated by the arrow), the heated surfaces come closer together and are brought into smooth contact as the narrow edge 7 of the blade slips out from between them. A similar instrument with the handle reversed; that is, with the handle slanting upward adjacent the thin edge; is used to form parts of the lining which cannot easily be formed with an implement having a handle slanting in the direction shown in the drawing.

Cement B has been found suitable for use with the plastic sold by United States Stoneware Company under the trade name Tygon. It may be used on a plastic copolymer of 95 parts vinyl chloride and 5 parts diethyl fumarate, which is suitable for lining tanks. As the composition of the plastic lining is altered, the composition of one or both of the cements may advantageously be changed. Any suitable cement may be employed.

After the two sheets of plastic have been cemented and pressed in place, the sealing implement is run under the uncemented edge of the overlapping sheet of plastic to heat its undersurface and to heat the upper flat surface of the undersheet. With the vinyl chloride-diethyl fumarate plastic mentioned or with Tygon, a temperature of about 250–300° F. forms a satisfactory seal. With other plastics, a different sealing temperature may be desirable. While the heated surfaces are still hot, an even pressure is applied to them to form a good heat seal 20.

After the seal has been completed, the tank may be filled with any liquid which does not attack the plastic. The heat seal 20 unites the under side of the inner edge of the ply 16 and the top surface of the ply 14 so that whatever the liquid in the tank, it does not contact the cement seal 15 and cannot weaken it.

What I claim is:

A metal tank lined with a heat-sealable plastic and in the lining a lap joint formed from two pieces of plastic, the first piece covering and cemented to a part of the inner metal surface of the tank and having a flat inner surface and a skived edge, and the second piece of plastic covering and cemented to the metal surface of the tank adjacent the skived edge and extending over and cemented to the skived edge of the first sheet and overlapping the flat inner surface of the first piece of plastic beyond the skived edge and having its undersurface heat-sealed to the flat inner surface only of the first piece adjacent the skived edge.

LYNN A. CARNEY.